May 2, 1933.  A. H. BURNHAM, JR  1,907,383
GALVANIZING APPARATUS AND METHOD
Filed April 25, 1929  3 Sheets-Sheet 1

Inventor
Alfred H. Burnham, Jr.

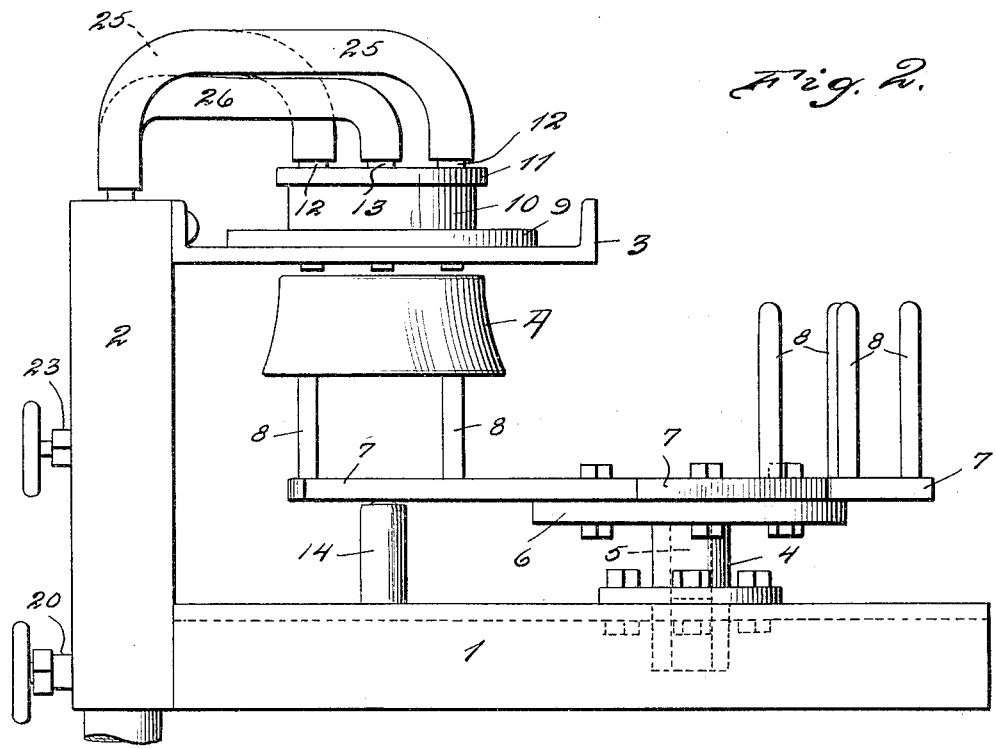
Fig. 2.
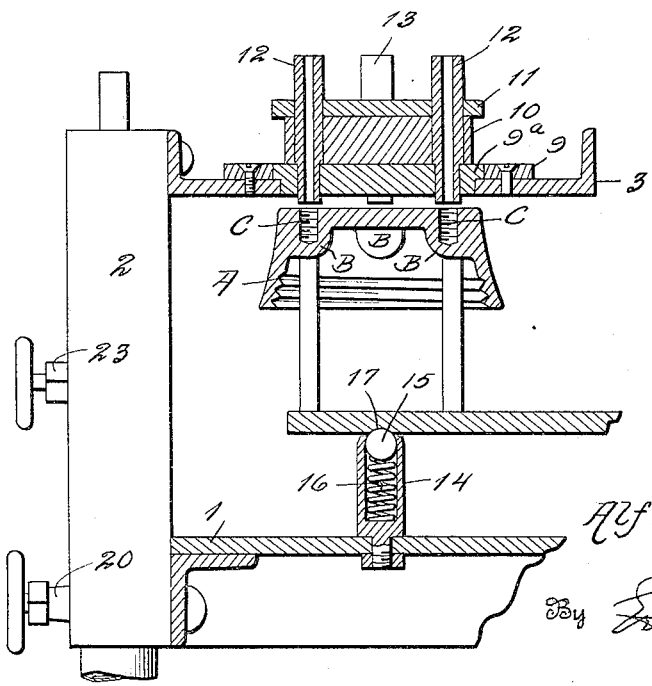
Fig. 3.
Inventor
Alfred H. Burnham, Jr.
Attorney

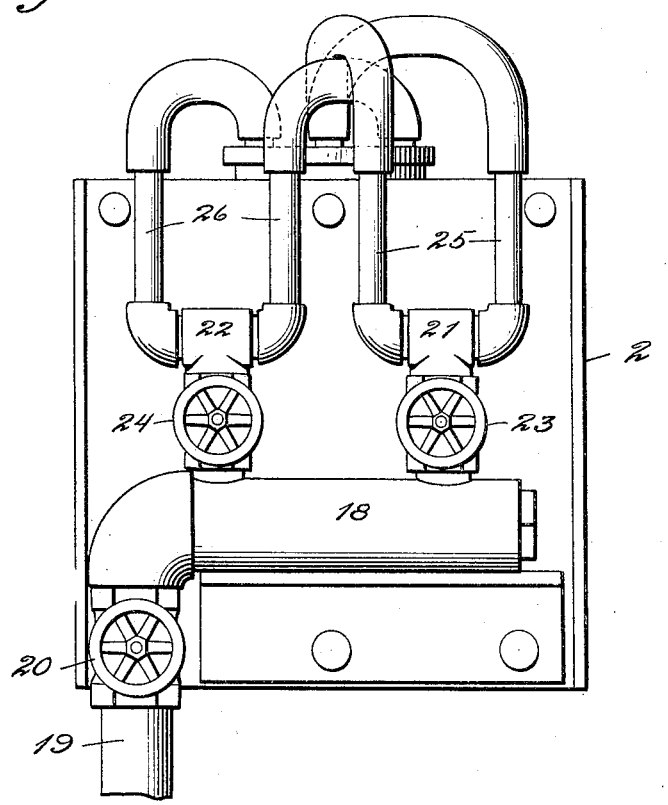
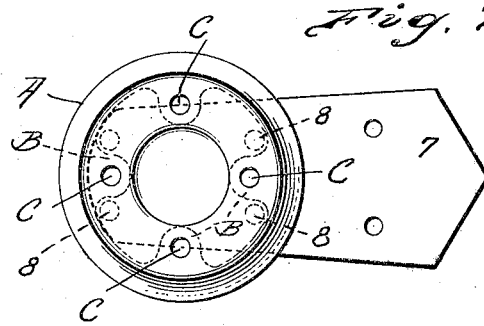
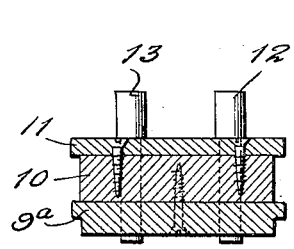

Patented May 2, 1933

1,907,383

UNITED STATES PATENT OFFICE

ALFRED H. BURNHAM, JR., OF COLUMBUS, OHIO, ASSIGNOR TO LOCKE INSULATOR CORPORATION, OF BALTIMORE, MARYLAND, A CORPORATION OF MARYLAND

GALVANIZING APPARATUS AND METHOD

Application filed April 25, 1929. Serial No. 358,103.

The invention relates to the galvanizing art and has special reference to a method of and means for insuring proper galvanizing treatment of threaded holes.

In the making of insulators, such as those of the pedestal and in fact other types, bus bar supports and the like, use is made of metal caps having threaded holes therein for the reception of screws for securing parts thereto. Such hardware is galvanized to give it a protective coating which will not rust or corrode from the action of water or gases in the air. In other arts use is made of metallic members which must similarly be galvanized. Where such elements have threaded holes or recesses therein there is quite a problem involved in effecting galvanizing of the threads without leaving an excess quantity of galvanizing material therein interfering with the insertion of the screws when the element is to be assembled with respect to coacting elements.

It is with the above facts in view that I have devised the present invention which has for its general object the provision of a method of and means for removing the excess galvanizing material which is caught within the threads when the metallic cap or other element is dipped into the galvanizing solution.

An important object of the invention is to provide a method of removing the excess galvanizing material or spelter by means of air or other gas, or a liquid, at any desired temperature and under pressure so that the threads will be left clean.

Another important object of the invention is to provide an apparatus by means of which insulator caps or similar elements previously dipped into a galvanizing bath may be subjected to the action of compressed air, gas or liquid so that the excess spelter or the like will be blown out of the grooves in the threads.

A more specific object of the invention is to provide an apparatus adapted to receive and support insulator caps which have been previously dipped and to bring them into such position that the tapped or threaded holes or recesses therein will be brought into the path of air or other fluid jets, the arrangement being such that the work may be carried out expeditiously.

An additional object of the invention is to provide a method and apparatus for the purpose specified which will be simple, inexpensive and yet unusually effective and a general improvement in the art.

To the attainment of the foregoing and other objects and advantages, the invention consists in the method and also in the apparatus to be hereinafter more fully described and claimed, the apparatus being, moreover, illustrated in the accompanying drawings in which:

Figure 2 is a side elevation thereof with an insulator cap being acted upon,

Figure 3 is a vertical longitudinal section taken on the line 3—3 of Figure 1,

Figure 4 is a vertical cross section taken on the line 4—4 of Figure 1,

Figure 5 is an end view,

Figure 6 is a detail section taken on the line 6—6 of Figure 1, and

Figure 7 is a plan view of a cap supported upon one of the arms of the turntable forming part of the device.

Figure 1:
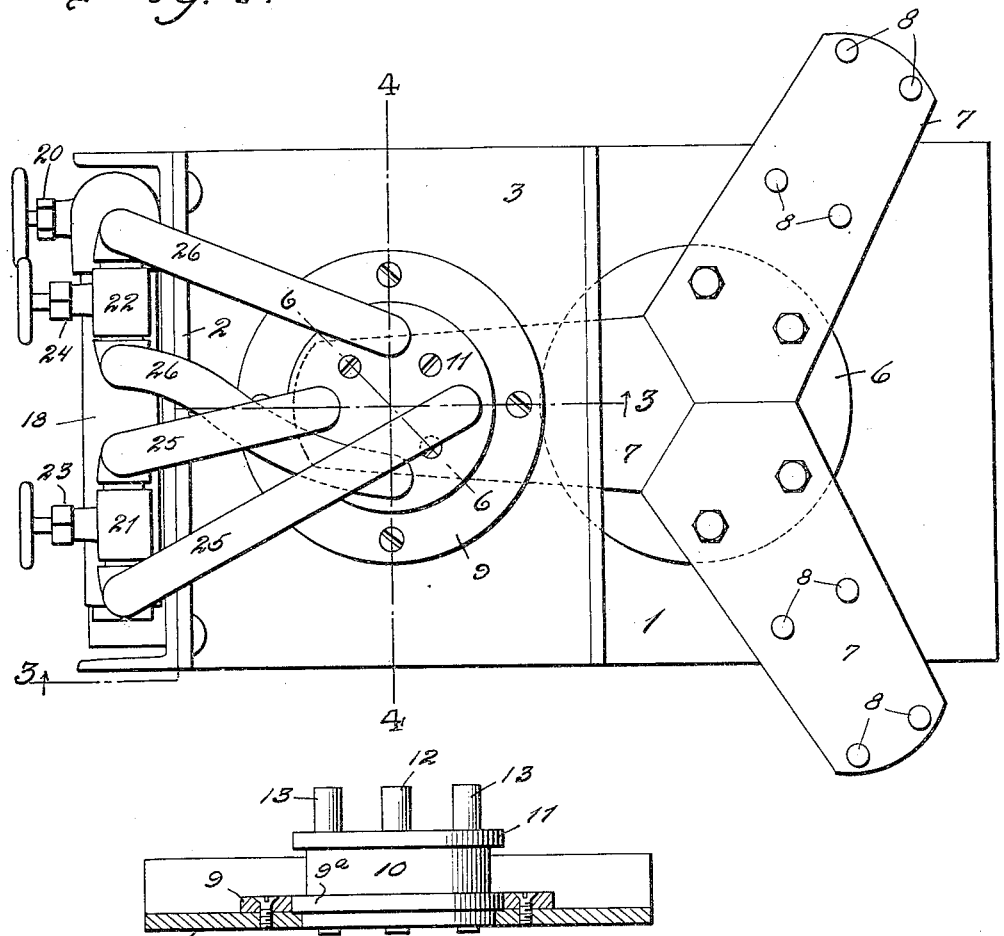
Figure 1 is a plan view of the entire device.

Generally considered, my method comprises, broadly, dipping the cap or other metal member into a hot spelter bath, removing the piece from the kettle, inverting the piece to drain most of the excess spelter, or the like, from the threaded or tapped holes, and then directing a current of liquid or a jet or blast of air or other gas into the holes to blow out any excess galvanizing material adhering within the grooves of the threads, the liquid or gas being used at any desired temperature found suitable or most advantageous.

This is the broad conception involved and it is apparent that it may be carried out in various ways, though I have devised a simple apparatus for rapidly and easily carrying out the operation by means of compressed air or other fluid, this apparatus being described in detail hereinafter.

Referring more particularly to the drawings, I have shown the apparatus as comprising a suitable supporting structure here represented as including a base or platform 1 from which rises an upright support 2 carrying a shelf 3. The base is equipped with a bearing 4 receiving a spindle 5 rotatable therein and depending from a turntable 6 which is shown as having a plurality of radially extending arms 7 equipped with upstanding pins 8 adapted to support the metallic member to be worked upon, in the present instance an insulator cap A. The cap is here disclosed as of a type formed internally with spaced projections or thickened portions B within which extend threaded holes or sockets C. In the present instance the pins 8 are therefore illustrated as arranged in such manner as to engage against opposite sides of diametrically opposite ones of the projections or thickened portions B (see Figure 7). Clearly, the pin arrangement or the substitution of other elements for the pins would depend upon the nature of the metallic member to be supported.

Carried by the shelf or bracket 3 is the jet arrangement which may be of any preferred detailed construction which is here represented as comprising parts 9, 10 and 11 which support tubes or nozzles 12 and 13 which are arranged in pairs, those in each pair being diametrically opposite for a reason to be explained hereinafter. These jets are arranged to correspond with the location of the tapped or threaded holes C in the cap or other member to be treated or worked upon and the pins 8 on the respective arms 7 support the caps or the like in such position that when the turntable is rotated, by hand or any other means, the caps will be brought successively beneath the jet structure as indicated in Figures 3 and 4. It is desirable and in fact necessary that the rotation of the turntable cease when the cap is in proper position and though this may be accomplished in various ways, a convenient plan is to provide a species of friction latch shown in detail in Figure 3 and which may comprise a socket member 14 mounted on the base or platform 1 and containing a ball 15 projecting slightly thereabove and urged upwardly by a spring 16 for engagement within a recess 17 in the underside of each arm 7. By this simple expedient the successive arms are held in the proper position while at the same time a positive rotative pull or push upon the turntable will release this latch means and permit rotation to bring the next arm and cap in place.

Suitably carried upon the upright 2 is a manifold 18 having a fluid pressure conducting pipe 19 connected therewith, a cut-off valve 20 being interposed in the pipe. Connected and communicating with the manifold 18 are other pipes 21 and 22 having interposed therein, respectively, valves 23 and 24 and connected in turn with branch pipes 25 and 26. The branch pipes 25 are connected, either directly or by flexible connections, if preferred, with the tubes or nozzles 12 while the pipes 26 are similarly connected with the tubes or nozzles 13.

In the operation, the cap A is first galvanized by the usual hot dipped method. The operator then removes the piece or cap from the kettle and inverts it to permit most of the excess spelter or galvanizing material to drain from the holes C. The cap is then placed upon the pins 8 on one of the arms 7 and the turntable 6 is then rotated to bring the cap under the jet device, the latch acting to hold the arm 7 in such position that the cap will be so disposed that the threaded holes C therein will register with the nozzles 12 and 13. Ordinarily caps of this type have four threaded holes or sockets in them and it is for this reason that I have shown four nozzles. In some instances there may be only two holes, diametrically opposite, in which event they will register with either the nozzles 12 or 13. The time interval between the removal of the cap from the galvanizing bath and the disposition of the cap in proper position beneath the jets or nozzles is sufficiently small that the spelter adhering to the threads in the holes is still fluid as the cap retains its heat for a considerable time. When the cap is thus brought beneath the nozzles, the operator opens the valves 23 and 24 whereupon air or whatever other fluid is employed under pressure entering the manifold 18 through the pipe 19 will pass out through the pipes 21 and 22 into the branch pipes 25 and 26 and be thence discharged through the nozzles 12 and 13 respectively. The blasts or jets of fluid issuing from these nozzles will enter the threaded holes in the cap and blow out the molten spelter or the like still clinging within the grooves of the threads. The valves may then be closed, or left open if preferred, while the turntable is rotated to bring the next cap in position. The operation is of course intended to be continuous and caps are removed from the galvanizing bath and placed upon the successive arms as fast as the work can be done. As the latch device cooperates with each arm, each will be held in the proper operative relation to the jet device so that the registration of the threaded holes with the nozzles will be certain.

In case the caps to be worked upon are provided with only two holes diametrically arranged, only one of the valves 23 or 24 need be opened as the flow of fluid will be needed at only two nozzles. In such an event the caps should be so placed upon the respective arms that their holes will be in the same relative positions to come beneath the two jets or nozzles that are active, that is to say the two which are fed from the particular pipe in which the valve is open.

From the foregoing description and a study of the drawings it will be apparent that I have thus provided a simply constructed, inexpensive and easily operated device by means of which the threaded holes in metal pieces may be freed of any surplus galvanizing material, the apparatus being so designed as to make use of my novel method for cleaning the threads. It will be noted that my method is certain and cannot result in any injury to the pieces.

While I have shown and described a preferred embodiment of apparatus for carrying out my method, it should of course be understood that I reserve the right to make such changes in the details of construction and the arrangement and combination of parts as will not depart from the spirit of the invention or the scope of the claims hereunto appended.

Having thus described the invention, I claim:

1. A device for removing excess galvanizing material remaining within threaded holes in cup-like metallic members which have been dipped into a bath of galvanizing material, comprising a stationary support, a plurality of stationarily mounted nozzles on said support adapted to have a current of fluid passed therethrough, a turntable mounted on the support provided with means for holding a plurality of the metallic members, the turntable being movable to bring said members into position with the holes therein substantially registering with said nozzles, and means on the support cooperating with the turntable for holding the same against rotation with the holes registering with the nozzles.

2. An apparatus for removing excess material from holes in metallic members previously dipped in a bath of galvanizing liquid, comprising a support, a bracket thereon, a plurality of vertically arranged nozzles carried by the bracket, a turntable mounted on the support, means on the turntable for supporting a plurality of said metallic members, means on the support cooperating with the turntable for holding the same against rotation with the holes in said members registering with the nozzles, and selectively operable valve controlled means for forcing fluid under pressure into selected ones of said nozzles.

In testimony whereof I affix my signature.

ALFRED H. BURNHAM, Jr.